S. CAESAR.
METALLIC PISTON ROD PACKING.
APPLICATION FILED SEPT. 8, 1913.

1,085,377.

Patented Jan. 27, 1914.

S. Caesar,
Inventor

UNITED STATES PATENT OFFICE.

SAMUEL CAESAR, OF CHIPPEWA FALLS, WISCONSIN.

METALLIC PISTON-ROD PACKING.

1,085,377. Specification of Letters Patent. Patented Jan. 27, 1914.

Application filed September 8, 1913. Serial No. 788,703.

*To all whom it may concern:*

Be it known that I, SAMUEL CAESAR, a citizen of the United States, residing at Chippewa Falls, in the county of Chippewa and State of Wisconsin, have invented a new and useful Metallic Piston-Rod Packing, of which the following is a specification.

The present invention appertains to a metallic piston rod packing, and aims to provide a novel and improved device of that nature.

It is the object of the present invention to provide a piston rod packing constructed entirely of metallic parts and embodying a unique combination or arrangement of its component parts so as to best adapt it for the purposes intended, and to carry out the desired functions in an efficacious manner.

Another object of the present invention is to provide a device of the character specified which shall be comparatively simple, compact and inexpensive in construction, as well as convenient and efficient in its use, and being so constructed that its several component parts may be readily assembled and disassembled.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1:
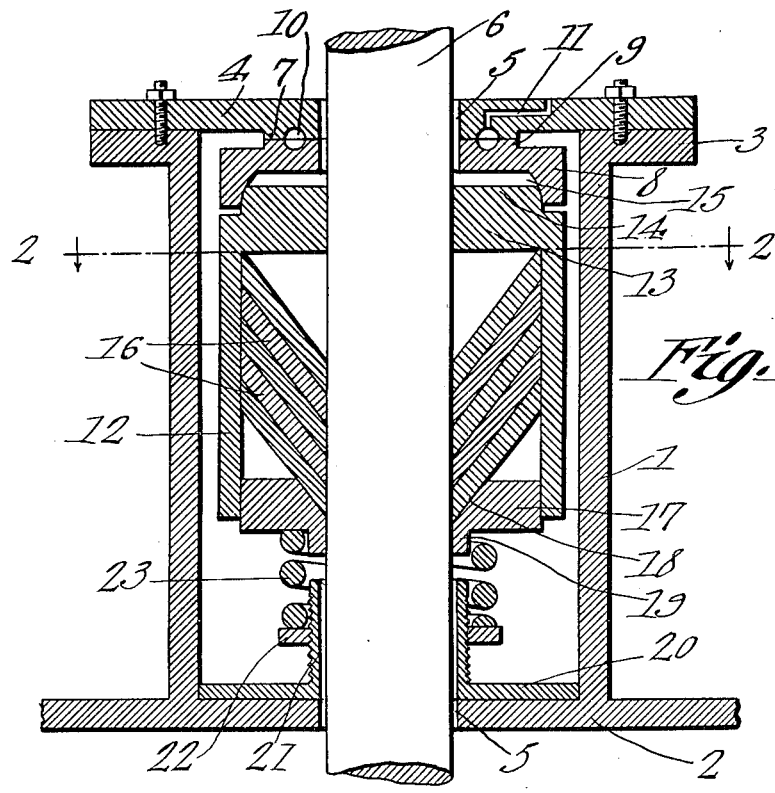
Figure 2:
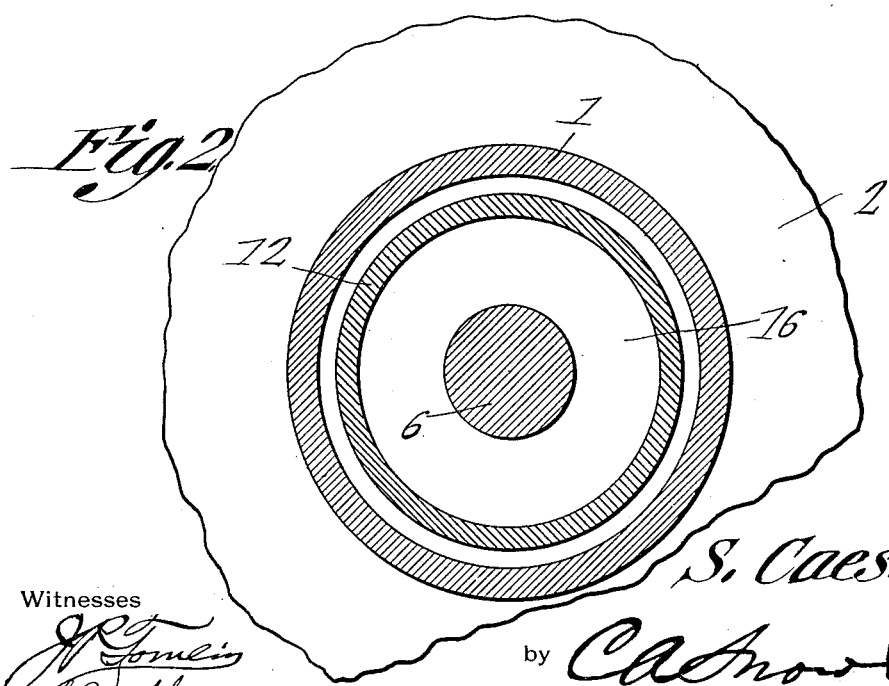

Figure 1 is a longitudinal section of the improved packing. Fig. 2 is a cross section thereof, taken on the line 2—2 of Fig. 1.

Referring specifically to the drawing, the numeral 1 designates the stuffing box, which is preferably cast integral with the head 2 of the cylinder, although the member 2 may be taken to represent a plate attachable to the head of a cylinder. The stuffing box 1 is provided at its outer or free end with an external or outturned flange 3 against which the gland or cap 4 is adapted to be bolted or otherwise attached. The gland or cap 4 and the head 2 of the cylinder are provided with the central openings 5 through which the piston rod 6 passes loosely.

In carrying out the present invention the cap or plate 4 is provided with an inner boss 7 surrounding the respective opening 5, and an annulus or ring 8 loosely surrounds the piston rod next inside or adjoining the cap 4, the annulus or ring 8 being provided with an outer boss 9 complementing the boss 7 of the cap. The bosses 7 and 9 are relatively wide, and have a flush or snug fit. The bosses 7 and 9 are provided with the complementary or coöperating annular lubricant grooves or channels 10, while the cap 4 is provided with a duct 11 leading from the respective groove 10 to the outer face of the cap, in order that oil or other lubricant may be injected into the grooves 10. The lubricant being contained within the grooves 10 will serve to provide a liquid seal for preventing the escape of steam through the stuffing box, and furthermore, the lubricant will work between the faces of the bosses 7 and 9, and will also find its way to the piston rod, whereby the wearing surfaces will be properly lubricated. At this point, it might be pointed out, that the piston rod 6 in working loosely through the cap or gland 4 may shift slightly out of proper alinement or true, due to the improper reciprocation of the cross head, the annulus or ring 8 surrounding the piston rod and shifting laterally therewith on the inner side of the cap or gland. As the annulus or ring 8 is shifted laterally, the boss 9 thereof will slide snugly against the boss 7 of the cap, in order to provide a snug fit between the annulus 8 and the cap at all times.

Disposed concentrically within the stuffing box 1 is a sleeve 12, the sleeve being slightly smaller in diameter than the stuffing box 1, and having an internal or inturned flange 13 at its outer end snugly embracing the piston rod. The flange 13 is formed with an outwardly projecting boss 14, which enters a depression or cavity 15 formed in the inner side of the annulus or ring 8, the side walls of the base 14 and cavity 15 being concaved and convexed, respectively, in order to provide a ball and socket joint between the sleeve and the annulus. The annulus 8 therefore forms a seat against which the sleeve rests, it being observed that the sleeve moves laterally with the annulus or seat 8.

Fitting within the sleeve 12, are a plurality of conical metallic packing rings 16, which fit snugly together and which have their small ends or apices directed inwardly, while their basal portions or large ends are disposed outwardly. The peripheries of the packing rings 16 snugly engage the inner walls of the sleeve 12, the periphery of the outermost packing ring seating against the flange 13, while the smaller ends or apices of the packing rings snugly engage the piston rod.

An annulus or collar 17 snugly embraces the piston rod 16 and fits snugly within the mouth or inner end of the sleeve 12, the collar 17 being provided with an outer conical seat 18 receiving the apex of the innermost packing ring 16, the collar 17 being adapted to be forced outwardly, to compress the packing rings, as will hereinafter appear. The collar 17 is also provided with an inner boss or flange 19 surrounding the piston rod.

A disk or circular plate 20 loosely embraces the piston rod adjoining the head 2 of the cylinder, and fits snugly within the stuffing box 1, this disk or plate 20 being provided with an outwardly projecting collar or boss 21 embracing the piston rod, and an adjusting nut or spring seat 22 being threaded on the collar or boss 21. A suitable coiled compression spring 23 surrounds the piston rod 6 and is terminally seated against the collar 17 and the nut 22; the boss 19 and the collar 21 entering the terminal convolutions of the spring 23, to maintain the spring in proper working position.

In the operation of the improved packing, it will be evident that the piston rod may reciprocate as usual. The annulus or seat 8 engaging the piston rod, and the piston rod working loosely through the cap or gland 4, will permit the piston rod to move slightly out of alinement with the cylinder, due to the displacement of the cross head, which is frequently caused by wear and tear. The spring 23, being under compression between the collar 17 and the disk 20 will tend to seat the disk against the head 2 of the cylinder, and will also tend to force the collar 17 outwardly so as to tightly compress the packing rings within the sleeve 12 about the piston rod. The disk 20 fitting about the piston rod, fitting snugly within the stuffing box 1, and also being seated against the cylinder head 2, will serve as a primary means for preventing the escape of steam from the cylinder. The spring 23 in forcing the collar 17 outwardly to compress the packing rings, will also force the sleeve 12 outwardly, against the annulus 8, and consequently will force the annulus or seat 8 against the cap or gland 4. The annulus and cap coöperating as described, will also serve to prevent the escape of steam, as well as permitting the piston rod to move laterally slightly, the sleeve 12 and annulus 8 having a ball and socket joint which will permit the sleeve 12 to oscillate or vibrate slightly with respect to the annulus and piston rod, in order that the packing rings may most effectively embrace the piston rod under the varying conditions. It is also evident that the nut 22 may be adjusted for adjusting the tension of the spring 23, in order that the collar 17 may be properly forced over the apex of the innermost packing ring, to compress the packing rings against the piston rod.

From the foregoing, the other advantages and capabilities of the present device will be apparent to those versed in the art, and need not be itemized at length.

Having thus described the invention, what is claimed as new is:—

1. A piston rod packing including a stuffing box, a gland attached to the outer end thereof, a sleeve within the stuffing box having an inturned flange at its outer end to snugly embrace the piston rod, a plurality of conical packing rings disposed within the sleeve with their apices extending inwardly, a collar mounted snugly within the inner end of the sleeve and having a conical socket receiving the apex of the innermost packing ring, and a compression spring disposed between the collar and the inner end of the stuffing box.

2. A piston rod packing including a stuffing box, a gland attached to the outer end thereof, a sleeve within the stuffing box, packing rings disposed within the sleeve, a disk fitting snugly within the stuffing box adjoining the inner end thereof, and having a collar to snugly embrace the piston rod, a spring seat carried by the collar, and a compression spring disposed between the said seat and the packing rings.

3. A piston rod packing including a stuffing box, a gland attached to the outer end thereof, a sleeve within the stuffing box, packing rings disposed within the sleeve, a disk fitting snugly within the stuffing box at its inner end and having a collar to snugly embrace the piston rod, a nut threaded on the collar, and a coil spring disposed compressibly between the nut and the packing rings.

4. In a piston rod packing, a stuffing box, a gland attached to the outer end thereof and through which the piston rod is designed to pass loosely, an annulus seated against the inner side of the gland and designed to snugly embrace the piston rod, a sleeve within the stuffing box and having an inturned flange at its outer end to snugly embrace the piston rod, the said flange and annulus having a ball and socket joint, conical packing rings disposed within the sleeve, a collar fitting snugly within the inner end of the sleeve to compress the packing rings, a disk fitting within the inner end of the stuffing box and having an outwardly projecting collar to snugly embrace the piston rod, a nut threaded on the last mentioned collar, and a coiled compression spring disposed between the said nut and the first mentioned collar.

In testimony that I claim the foregoing as my own, I have hereto affixed my signature in the presence of two witnesses.

SAMUEL CAESAR.

Witnesses:
JOHN S. MONAT,
ANTON SOLBERG.

Copies of this patent may be obtained for five cents each, by addressing the "Commissioner of Patents, Washington, D. C."